H. J. DAUBEN & O. L. STUMP.
TROLLEY GUIDE.
APPLICATION FILED FEB. 10, 1915.
1,195,916.
Patented Aug. 22, 1916.
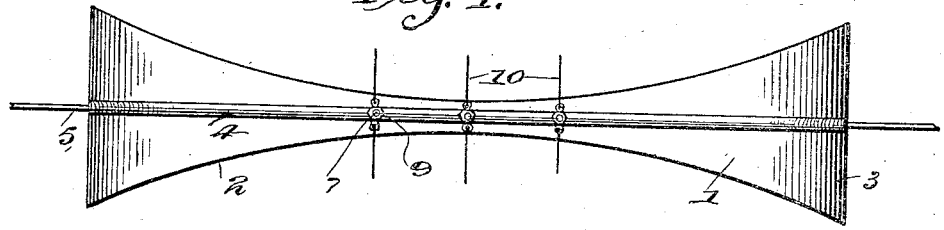
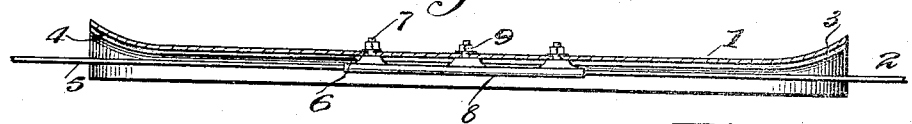
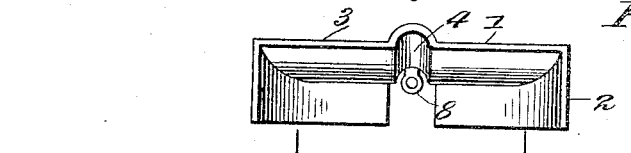
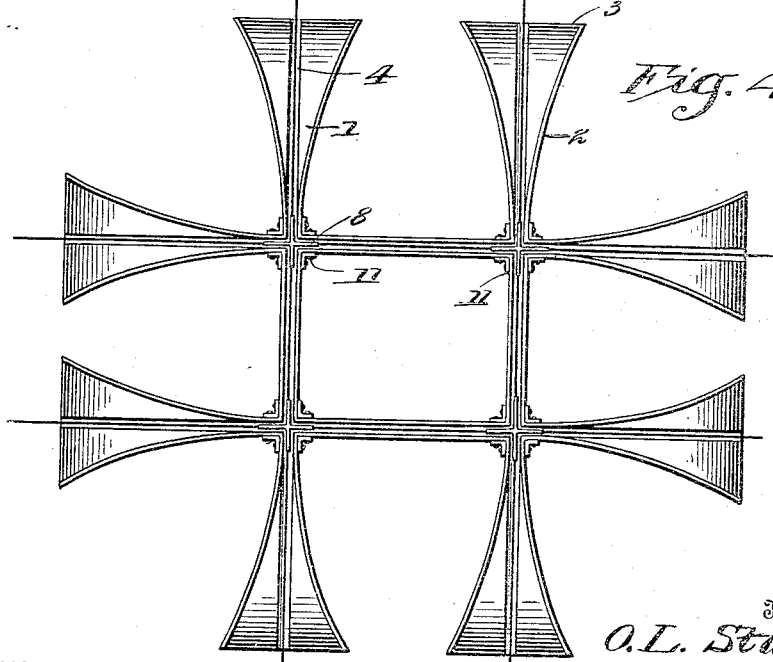
Inventors
O. L. Stump
H. J. Dauben
By Victor J. Evans
Attorney
Witnesses

UNITED STATES PATENT OFFICE.

HYPOLETTE J. DAUBEN, OF COLUMBUS, AND OMAN L. STUMP, OF MARION, OHIO.

TROLLEY-GUIDE.

1,195,916.　　　　　Specification of Letters Patent.　　Patented Aug. 22, 1916.

Application filed February 10, 1915.　Serial No. 7,374.

*To all whom it may concern:*

Be it known that we, HYPOLETTE J. DAUBEN and OMAN L. STUMP, citizens of the United States, residing, respectively, at Columbus, in the county of Franklin, and Marion, in the county of Marion, State of Ohio, have invented new and useful Improvements in Trolley-Guides, of which the following is a specification.

The present invention relates to improvements in means for guiding and replacing trolley wheels upon a feed wire, after the said trolley wheel has jumped the wire.

In carrying out our invention it is our purpose to construct a frog having arcuate sides providing guide flanges and curved ends which are adapted to be contacted by the trolley pole and wheel to cause the wheel to follow one of the side flanges and to be directed thereby to the feed wire.

We also aim to provide a device of this character which shall be simple, cheap to manufacture, easily and quickly installed and thoroughly accurate and which will perform the function for which it is devised with accuracy and with certainty.

With the above and other objects in view, the improvement resides in the construction, combination and arrangement of parts set forth in the following specification and falling within the scope of the appended claim.

In the drawing: Figure 1 is a top plan view of our improvement showing the same in applied position upon a feed wire, Fig. 2 is a central longitudinal section through the same, Fig. 3 is an end view of the device, and Fig. 4 is an inverted plan view illustrating the frog constructed in accordance with the invention and arranged upon the feed wires at a crossing.

Our improved frog may be constructed of any desired material, sheet metal, drop forged preferred. The frog comprises a flat top or body portion 1, having flanged sides 2, which are rounded outwardly from each other at the ends of the body so that the minimum width of the frog is at the center thereof. The top 1, at the ends of the frog, is formed with upwardly extending curved lips 3—3 and the said top is further provided with a centrally arranged longitudinally extending channel 4 which is arranged over the feed wire 5. In the device illustrated in Figs. 1, 2 and 3, the frog is positioned at the splice in the wire 5, the top being provided with a plurality of openings 6 through which project the bolts 7 of the splice member 8, and the said bolts are provided with securing nuts 9 which contact with the top of said frog to retain the same in position upon the wire. The frog is further maintained in proper position through the medium of transverse guy wires 10.

In Fig. 4 the device is substantially similar to that previously described, except that two pair of frogs arranged, each at a right angle, are employed, the device being adapted for use at a crossing where two tracks intersect. One pair of frogs at its juncture with the second pair of frogs is provided with substantially L-shaped cleats 11, whereby the sides at the said meeting ends are jointed, suitable securing elements passing through the members 11. If desired, however, the said device may be formed from a single casting and the cleats 11 integral therewith, the said cleats thus reinforcing the frog members.

It will be obvious that should a trolley wheel jump the feed wire and the momentum of the cars propel it toward the frog, the trolley pole or the trolley wheel will be contacted by the curved lips 3 which will cause said pole to incline upon its pivotal connection with the car, and so bring the wheel within one of the flared ends of the frog, while one of the flanges 2 will direct the wheel to the center of the frog where it will meet with and be replaced upon the feed wire 5. By providing the frogs with longitudinal grooves the feed wires 4 are concealed therein or protected thereby so that no injury can be inflicted thereon by the violent contact of the trolley wheel in being guided to its position upon the feed wire.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what we claim is:

A frog for the purpose set forth formed from a sheet of material comprising a flat body having side flanges which are curved outwardly from each other at the ends of the frog, said body, at its said ends being curved upwardly, the body being formed upon its inner face with a central channel extending longitudinally therewith to receive the feed wire and the upper wall provided by the channel adjacent the center of the frog being formed with spaced openings adapted to receive bolt members for a splice for the feed wire which is arranged centrally in the channel of the frog, and transverse supporting guy wires for the frog.

In testimony whereof we affix our signatures in presence of two witnesses.

HYPOLETTE J. DAUBEN.
OMAN L. STUMP.

Witnesses:
LULA G. STUMP,
CHAS. F. HURLEY.